(12) United States Patent
Ramirez-Rivera

(10) Patent No.: US 6,698,455 B2
(45) Date of Patent: Mar. 2, 2004

(54) FLUID MULTIECONOMIZER DEVICE

(76) Inventor: Pablo Alvaro Ramirez-Rivera, Calle Alvarez de Arcila No. 2038, Colonia San Felipe, C.P. 31240, Chihuahua, Chih (MX)

( * ) Notice: Subject to any disclaimer, the term of this patent is extended or adjusted under 35 U.S.C. 154(b) by 0 days.

(21) Appl. No.: 10/101,368

(22) Filed: Mar. 20, 2002

(65) Prior Publication Data

US 2003/0178077 A1 Sep. 25, 2003

(51) Int. Cl.⁷ .................................. F15D 1/02
(52) U.S. Cl. ...................... 138/44; 138/40; 62/511
(58) Field of Search ................ 138/40, 44, 39; 62/324.6, 511

(56) References Cited

U.S. PATENT DOCUMENTS

| | | | | |
|---|---|---|---|---|
| 2,804,928 A | * | 9/1957 | Farrar | 138/40 |
| 3,642,030 A | * | 2/1972 | Amick | 138/44 |
| 3,687,493 A | * | 8/1972 | Lock et al. | 138/44 |
| 3,702,144 A | * | 11/1972 | Loveland | 138/44 |
| 3,894,562 A | * | 7/1975 | Moseley et al. | 138/44 |
| 4,452,277 A | * | 6/1984 | Wells | 138/40 |
| 4,962,792 A | | 10/1990 | Chaul | 138/42 |
| 5,022,438 A | | 6/1991 | Faraon-Chaul | 138/42 |
| 5,085,058 A | * | 2/1992 | Aaron et al. | 138/44 |
| 5,592,974 A | * | 1/1997 | Grohs et al. | 138/40 |
| 5,937,906 A | * | 8/1999 | Kozyuk | 138/37 |
| 6,119,728 A | * | 9/2000 | Seidel-Peschmann et al. | 138/26 |

FOREIGN PATENT DOCUMENTS

DE 493311 A1 * 7/1992 ............. 138/44

OTHER PUBLICATIONS

WO 91/17382 Turnbull, Caroline Nov. 1991.*

* cited by examiner

*Primary Examiner*—Patrick Brinson
(74) *Attorney, Agent, or Firm*—Rothwell, Figg, Ernst & Manbeck

(57) ABSTRACT

There is disclosed a fluid flow rate economizing device having a tubular body and a reduction in the inner diameter, suitable to install inside residential, commercial or industrial hydraulic tubing at fluid intakes, meters and/or registers.

11 Claims, 2 Drawing Sheets

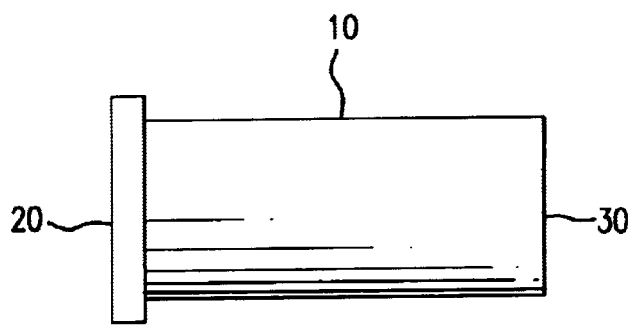
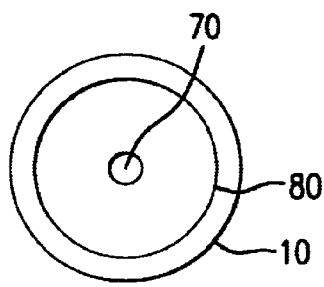
FIG. 1  FIG. 2
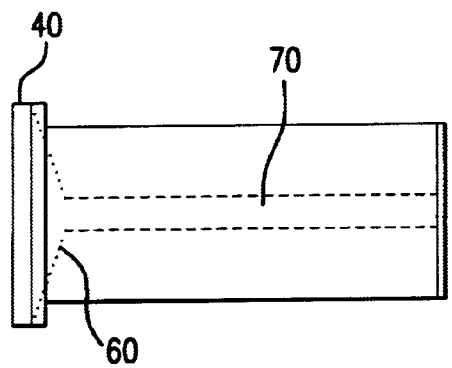
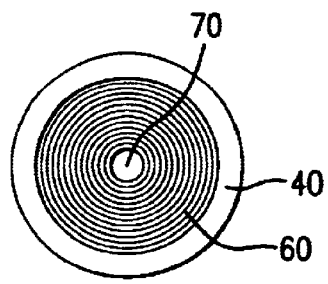
FIG. 3  FIG. 4
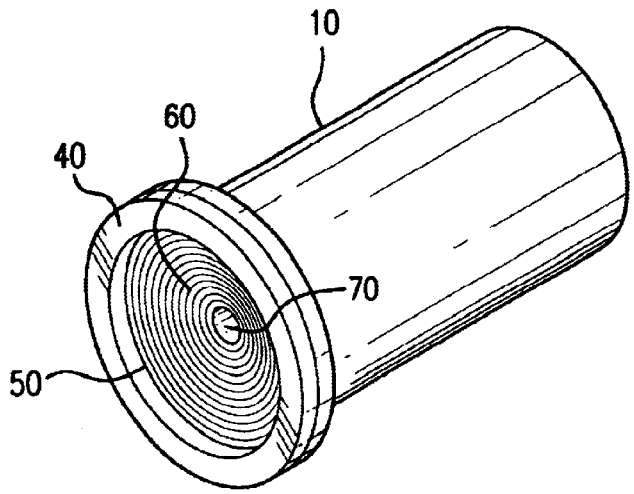
FIG. 5

FLUID MULTIECONOMIZER DEVICE

TECHNICAL FIELD

This invention relates generally to fluid flow rate saving devices for all kind of hydraulic installations, and more specifically, relates to a fluid flow rate saving device suitable to be installed inside residential, commercial or industrial hydraulic tubing, meters and/or registers, by limiting the flow in each outlet of the hydraulic system without affecting the pressure in the flow outlets.

BACKGROUND OF THE INVENTION

Nowadays, it becomes necessary to save as much as possible our natural resources which are being wasted in a great extent. One of said natural resources needful for every living being is water, which has to be cared from now on in order to ensure the availability thereof in the years to come.

With this object in mind, many devices well known in the art have been designed in order to avoid an excessive consume of water, as those installed in wash basin taps, sink taps, bath taps, cistern inlets, or shower nozzles of the type of a metallic or plastic plate having one or more holes within the aerator located at the exit of each one of the above mentioned plumbing fixtures, achieving a reduction in the flow rate.

However, in order to achieve a substantial reduction in the residential, commercial or industrial wasted flow rate, it is necessary to acquire one of said devices per each plumbing outlet, which leads to a great investment of money in devices.

Additionally, other kind of devices for the same purpose have been developed, as that described in U.S. Pat. No. 4,962,792 by Faraon-Chaul. This document teaches a non clogging, quiet needle type fluid saving device which limits the flow rate of the fluid, thus allowing a saving on fluid. The internal parts of the device, namely, a spring, washers, o-ring, and other allow the operation of the device in a non-clogging quite manner.

U.S. Pat. No. 5,022,438 also by Faraon-Chaul, teaches an improvement on the fluid saving device described on said U.S. Pat. No. 4,962,792. The improvement consist in a different arrangement of the internal fittings of the device, avoiding the dislodgement of the soft washer within a housing instead of sandwiched it between two hard washers.

However, this kind of devices having a threaded connection tube and internal fittings are of a expensive manufacture, and the internal fittings can suffer breaks and/or dislodgments.

SUMMARY OF THE INVENTION

Considering the disadvantages of the fluid saving devices of the prior art, it is an object of the present invention to provide a very simple, versatile and economic fluid multieconomizer device which is manufactures in a single piece.

An additional object of the present invention is to provide a fluid multieconomizer device of the above mentioned character, which is of quiet operation.

The foregoing objects and others ancillary thereto are preferably accomplished as follows:

According to the preferred embodiment of the present invention, a fluid multieconomizer device comprises a tubular body with an internal orifice along the central part of the tubular body, which can be of different diameters depending on the requirements of flow rate and discharge pressure in an hydraulic system.

The devices of the present invention allows a reduction in all outlets from 20% to 65% of fluid flow rate, depending upon the outlet type and the pressure on the fluid meter or intake.

BRIEF DESCRIPTION OF THE DRAWINGS

The novel aspects regarded as characteristic of the present invention will be established particularly in the appended claims. However, the invention itself, both as to its organization and its operation method, together with additional objects and advantages thereof, will be best understood in the following detailed description of the specific embodiment, when read in connection with the accompanying drawings, wherein:

FIG. 1 shows an enlarged side plan view of the fluid multieconomizer device of the present invention.

FIG. 2 shows a rear plan view of the fluid multieconomizer device of the present invention.

FIG. 3 shows a side cross-section view of the fluid multieconomizer device of the present invention.

FIG. 4 shows a top plan view of the fluid multieconomizer device of the present invention.

FIG. 5 shows a perspective side view of the fluid multieconomizer device of the present invention.

DETAILED DESCRIPTION

Figure 6:
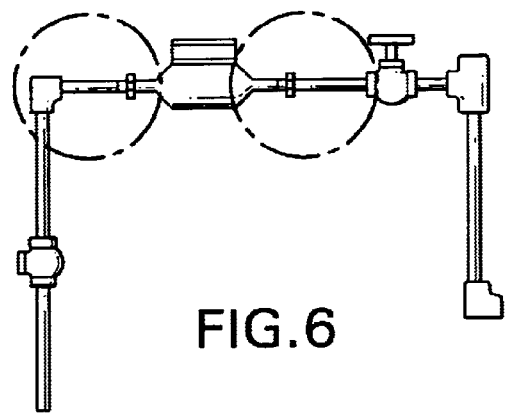
FIG. 6 shows a side elevation view of a meter installation illustrating the placement details of the fluid multieconomizer device of the present invention inside the tubing before the meter or register.

Referring now to FIG. 1 of the drawings, there is shown a fluid multieconomizer device built according to the present invention, particularly designed to restrict and save the flow rate of a fluid at all outlets of a residential, commercial or industrial hydraulic system.

The fluid multieconomizer device comprises a single smooth tubular fitting (10) having an inlet end (20) and an outer end (30), the inlet end (20) being of an outer diameter larger that that of the reminder of the tubular fitting (10) in order to form a flange (40) extending outwards said fitting body, said inlet end (20) having an inner diameter (50) larger that that of the reminder of said fitting body (10).

The inlet end (20) includes an inner frustoconical shaped projection (60) which interconnects the inner diameter (50) of said inlet end (20) with the inner diameter (70) of the reminder of the tubular fitting (10). Said inner diameter (70) extends along the tubular fitting (10) up to the outlet end (30).

The operation of this device is quite simple, since the fluid reaching the inlet end (20) is forced to go through the reduced inner diameter (70) of the tubular fitting (10) achieving a reduction in the flow rate of said fluid at the outlet end (30).

Figure 7:
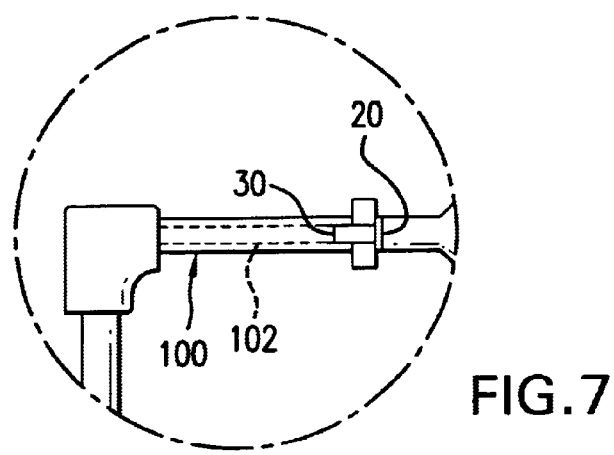
FIG. 7 shows a side enlarged partial cross-section view illustrating the location of the device of the present invention inside the tubing after the meter or register.
Figure 8:
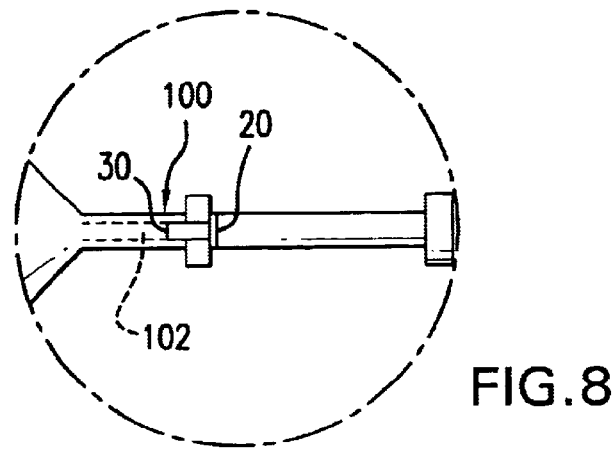
FIG. 8 shows a side enlarged partial cross-section view illustrating the location of the device of the present invention inside the tubing before the meter or register.

The devices of the present invention are installed inside tubing (100) before or after fluid intakes, meters and/or registers, preferably before or after the fluid intake, meters and/or registers, as shown in FIG. 6. An outer diameter of the device from the outlet end to the flange is substantially smooth and flush against an inner diameter (102) of the tubing (100), as shown in FIGS. 7 and 8. The use of the present devices allows a saving in the fluid flow rate at all fluid outlets, namely taps, cisterns, showers and the like, without affecting the outlet pressure thereon.

The multieconomizer device of the present invention allows a reduction in consumption of fluid flow rate in an hydraulic system in a range from 20% to 65%.

Said multieconomizer device can be manufactured from different metallic materials, like aluminum, bronze, copper or polymeric materials such as PVC or Nylon (RTM).

The inner diameter of the tubular body can vary in a range from 0.2 mm to 4.2 mm, and its selection will depend on the necessity of fluid pressure and discharge rate in the hydraulic system.

The pressure achieved with the saving device can vary from 1 to 8 kg/cm2.

Even though a preferred embodiment of the present invention has been described for illustration purposes, those skilled in the art will appreciate that many additions, modifications as well as substitutions are possible without departing from the spirit and scope of the present invention, as defined in the accompanying claims.

I claim:

1. A tubular fitting fluid flow rate economizing device of the type suitable to be installed inside a hydraulic tubing, comprising:

an inlet end and an outlet end, wherein said in let end is conformed by an outer diameter larger then that of the remainder of the tubular fitting in order to form a flange extending outwards said fitting body, said inlet end having an inner diameter larger than that of the remainder of said fitting body; the inlet end including an inner frustoconical shaped projection interconnecting the inner diameter of said inlet end with the inner diameter of the reminder of the tubular fitting, said inner diameter extending along the tubular fitting up to the outlet end; and wherein an outer diameter of said fitting from said flange to said outet end is substantially smooth and flush against an inner diameter of said hydraulic tubing.

2. The tubular fluid flow rate economizing device according to claim 1, wherein the inner diameter varies in a range from 0.2 mm to 4.2 mm.

3. The tubular fluid flow rate economizing device according to claim 1 wherein the reduction in the inner diameter allows to reduce the fluid flow rate without affecting the pressure on the hydraulic system outlets in a range from 20% to 65%.

4. The tubular fluid flow rate economizing device according to claim 3, wherein the pressure achieved with the device can very from 1 to 8 kg/cm2.

5. The tubular fluid flow rate economizing device according to claim 1, wherein said device is manufactured from a metallic material or polymeric material.

6. The tubular fluid flow rate economizing device accordir to claim 5, wherein said device is manufactured from aluminum, bronze or copper.

7. The tubular fluid flow rate economizing device according to claim 5, wherein the polymeric material is Nylon (RTM).

8. The tubular fluid flow rate economizer device according to claim 5, wherein the polymeric material is PVC.

9. The use of a single tubular fitting fluid flow rate economizing device according to claim 1, to obtain fluid flow savings in a residential, commercial, or industrial hydraulic system.

10. A tubular fitting fluid flow rate economizing device of the type suitable to be installed inside hydraulic tubing comprising an inlet end and an outlet end conformed by an outer diameter larger than that of the remainder of the tubular fitting in order to form a flange extending outwards said fitting body said inlet end having an inner diameter larger than that of the remainder of said fitting body; the inlet end including an inner frustoconical shaped projection interconnecting the inner diameter of said inlet end with the inner diameter of the reminder of the tubular fitting, said inner diameter extending along the tubular fitting up to the outlet end, wherein the reduction in the inner diameter allows to reduce the fluid flow rate without affecting the pressure on the hydraulic system outlets in a range from 20% to 60%.

11. The tubular fluid flow rate economizing device according to claim 10, wherein the pressure achieved with the device on the hydraulic system ranges from 1 to 8 kg/cm2.

* * * * *